United States Patent
Overbeck et al.

[11] Patent Number: 6,072,387
[45] Date of Patent: Jun. 6, 2000

[54] DEVICE FOR TRIGGERING A CONTROL AND/OR WARNING PROCESS IN A MOTOR VEHICLE

[75] Inventors: Felix Overbeck, Mettmann; Werner Wallrafen, Hofheim, both of Germany

[73] Assignee: Mannesmann VDO AG, Frankfurt, Germany

[21] Appl. No.: 09/022,705

[22] Filed: Feb. 12, 1998

[30] Foreign Application Priority Data

Feb. 14, 1997 [DE] Germany .............................. 197 05 635

[51] Int. Cl.[7] .................................................. B60Q 1/00
[52] U.S. Cl. ...................... 340/438; 340/425.5; 340/441; 340/601; 340/905
[58] Field of Search .................................. 340/425.5, 431, 340/438, 441, 936, 905, 904, 901, 601, 949, 968, 979; 701/1; 73/170.11, 170.14

[56] References Cited

U.S. PATENT DOCUMENTS

| | | | |
|---|---|---|---|
| 2,849,701 | 8/1958 | Clark ........................................ | 340/601 |
| 3,798,593 | 3/1974 | Sartor ....................................... | 340/441 |
| 4,229,727 | 10/1980 | Gilhooley ................................. | 340/441 |
| 4,295,139 | 10/1981 | Arpino ..................................... | 340/949 |
| 4,750,356 | 6/1988 | Sommer ..................................... | 73/180 |
| 5,032,821 | 7/1991 | Domanico et al. ....................... | 340/461 |
| 5,315,295 | 5/1994 | Fujii ......................................... | 340/936 |
| 5,729,214 | 3/1998 | Moore ...................................... | 340/905 |

Primary Examiner—Brent A. Swarthout
Attorney, Agent, or Firm—Martin A. Farber

[57] ABSTRACT

A device for triggering a control and/or warning process in a motor vehicle has sensors for determining the existing value of the crosswind actually acting on the vehicle. A crosswind warning device for motor vehicles which permits of a reliable warning for the driver even under varying conditions of the wind, has a first device for the determination and evaluation of the limiting value of crosswind in the motor vehicle for determining a crosswind speed limiting value which is dependent on the actual travel conditions of the vehicle. The values detected by a second device for the determination of the existing crosswind value are fed to the first device and compared with the detected crosswind speed limiting values. A driver-information device is actuated as a function of the comparison.

14 Claims, 2 Drawing Sheets

DEVICE FOR TRIGGERING A CONTROL AND/OR WARNING PROCESS IN A MOTOR VEHICLE

FIELD AND BACKGROUND OF THE INVENTION

The present invention relates to a device for triggering a control and/or warning process in a motor vehicle with means for determining the value of a crosswind actually acting on the vehicle.

It is known to measure the crosswind components actually acting on the vehicle by means of wind-speed sensors arranged on the vehicle itself and, as a function of these signals, to intervene via a closed-loop control in the steering of the motor vehicle, in which connection an automatic correction of the steering minimizes the influence of the crosswind at the existing speed of travel of the vehicle.

No warning is given to the driver in this connection. The failure of this automatic control therefore leads to unforeseen critical situations in traffic since the driver relies on the automatic control. The driver cannot respond and continues to drive at unreduced high speed.

Crosswind warning devices arranged permanently on the side of the road are also known, as a result of which the driver is led, in case of a strong wind, to drive more carefully and thus to reduce the speed of his vehicle so as to increase traffic safety.

These stationary warning devices have the disadvantage that they do not give the driver any exact information with regard to the crosswind component which is acting transverse to the vehicle and give only an approximate idea as to the strength of the crosswind present in the area through which he is traveling. In the event of suddenly varying wind conditions, for instance gusts of wind, the driver can, however, no longer respond in due time.

SUMMARY OF THE INVENTION

It is therefore an object of the invention to provide a device for motor vehicles which provides the driver with a reliable early warning and permits him to intervene in due time into the management of the engine even in the event of varying wind conditions.

According to the invention, a first device (4) for determining and evaluating a limiting speed value which is present in the vehicle (1) itself determines a limiting speed for the crosswind which is dependent on the existing travel conditions of the vehicle, and the device for the determination and evaluation of the limiting speed receives a present value of the crosswind speed from a second device (2) for the determination of the present value of the crosswind speed and compares this present value of the speed of the crosswind with the limiting value for the crosswind speed determined by first device, a driver-information device (14, 15) and/or a vehicle control device (14) being actuated in due time as a function of this comparison.

By such a sliding formation of the limiting value for the maximum permissible speed of the crosswind, a reliable, early warning can be given to the driver even in the event of varying wind conditions. The driver can adjust the driving in due time to the actual conditions by changing his speed of travel. The warning information is thus produced in the car itself.

The first device (4) for the determination and evaluation of the limiting value preferably detects or determines the existing limiting value of the crosswind speed at fixed time intervals during travel. These intervals become shorter and shorter the closer the existing value of the crosswind speed comes to the limiting value of the crosswind speed.

In a further development, the driver-information device is a signal transmitter for the production of an optical signal (15) or acoustic signal (14), which signal is actuated as the present value of the crosswind approaches the existing limiting value of the crosswind by the maximum-value determination and evaluation device.

The driver can thus give his full attention to the traffic conditions without having to continuously observe a display device.

The limiting value of the speed of the wind frequently depends not only on the wind speeds actually measured but also on the condition of the vehicle and the condition of the road traveled over by the vehicle. For this purpose, the first device (4) for the determination and evaluation of the limiting value is connected with sensors (8, 9, 10) present in the vehicle. The sensors detect the speed of the vehicle and/or the condition of the road and/or the condition of the vehicle. Thus, in addition to the speed of the vehicle, there can also be detected the gripping properties of the tires, the condition of loading of the vehicle, and the condition of the road (dry, wet, snow, ice). Properties which are specific to the vehicle, such as the lateral area of resistance and the drag coefficient can be stored in the memory of a microprocessor and be used for the determination of the maximum limiting value of the crosswind. This also applies to tire gripping properties such as air pressure and type of tread. These values are also stored in the vehicle and can be used, suitably weighted, for the determination of the limiting value. These values are taken continuously into consideration in the determination of the limiting value.

In one embodiment, the first device for the determination and evaluation of the limiting value is connected with an engine control device by which, after the warning has been given, the engine management is acted upon for the automatic reduction of the speed of the vehicle.

If, despite the warning, the driver does not change his speed of travel, then, upon rapid approach of the value of the speed of the crosswind to the limiting value of the speed of the crosswind, the first device for the determination and evaluation of the limiting value automatically gives a signal to the engine control electronics of the motor vehicle so as to reduce the speed of the vehicle.

According to another feature of the invention, the speed of travel of the motor vehicle can be automatically controlled via a motor vehicle control device (electronics 14) by the first device (4) for the determination and evaluation of the limiting value.

Still further, the invention provides that the steering of the vehicle is influenced by the first device (4) for the determination and evaluation of the limiting value.

Also according to the invention, the brake system of the vehicle can be influenced by the first device (4) for the determination and evaluation of the limiting value.

In one embodiment, the first device (4) for the determination and evaluation of the limiting value is a microprocessor.

In one embodiment, the second device (2) for determining the actual value of the crosswind is a wind speed sensor arranged on the vehicle itself.

Another development makes it possible for the second device (2) for the determination of the actual value of the cross wind to be arranged outside the motor vehicle and for the actual value of the crosswind determined for the location of the motor vehicle to be transmitted in wireless manner to the first device (4) for the determination and evaluation of the crosswind.

The first device (4) for determination and evaluation of the limiting value preferably receives the actual values of the crosswind via a mobile radio receiver (17) and furthermore has a navigation computer (18) which determines the location of the motor vehicle.

This system is particularly suitable for the early warning of the driver because the system enables determination by means of the location and the direction of travel whether the vehicle is approaching a region in which strong weather-produced crosswind influences act on the vehicle. By means of a central computer, the actual value of the crosswind, which corresponds to the location of the vehicle, is sent to the vehicle and further processed there.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
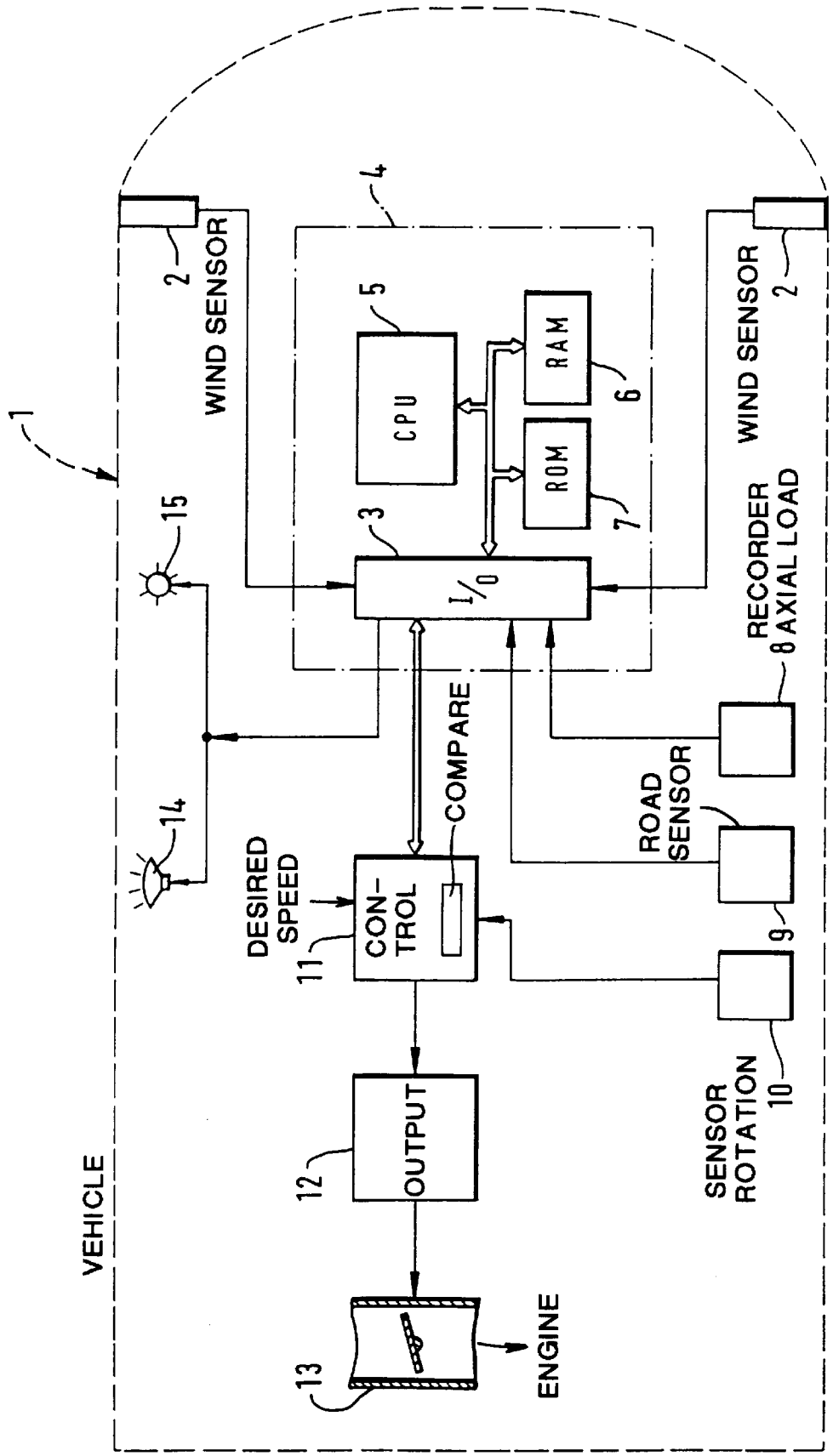
FIG. 1 is a block diagram showing a crosswind warning and/or control device with wind-speed sensors in accordance with the invention.

Identical features are indicated by the same reference numerals.

FIG. 1 shows diagrammatically a motor vehicle 1 having, on each of the longitudinal sides of the vehicle, a wind-speed sensor 2 for measuring the crosswind component occurring transverse to a direction of travel of the motor vehicle 1.

Each wind speed sensor 2 is connected to the input/output unit 3 of a microprocessor 4 present in the vehicle. The microprocessor 4 generally consists of a central processor unit 5 and of a random-access memory 6 and a read-only memory 7.

To the input/output unit 3 there are presented signals of a sensor 9 for the determination of the nature of the surface of the road by reflection measurements, and at least one measured-value recorder 8 with a wire strain gauge for detecting an axial load on the vehicle 1.

The microprocessor 4 is furthermore connected by a bus system to a motor control electronics 11 which is of a construction similar to that of the microprocessor 4. The motor control electronics 11 determines the speed of travel of the vehicle as a function of signals supplied by the speed-of-rotation sensor 10 and compares the travel speed with a desired speed which is entered by the driver. As a result of this comparison, the motor control electronics controls, via the output stage 12, the open angle of the throttle valve 13, which controls fuel flow to the engine and leads to the adjustment of the desired speed of the vehicle. The speed of the vehicle determined by the motor control electronics 11 is forwarded for processing via the bus system to the microprocessor 4.

During travel, the maximum permissible car-specific crosswind limiting value is determined by the microprocessor 4. In addition to the data actually supplied by the sensors 8, 9 and the motor control electronics 11, there are also taken into account data which are stored in the read-only memory 7. They include, among other things, tire-gripping properties such as air pressure and type of tread as well as characteristic data such as the lateral resistance area of the vehicle and the drag coefficient of the vehicle. These fixed values are stored in tables or fields of characteristics in the read-only memory 7, and are used to determine a weighting factor by the microprocessor 4 for the limiting value of wind speed determined from the actual sensor signals present.

The maximum crosswind limiting speed value is determined at predetermined time intervals which are established by a clock (not shown) contained in the microprocessor 4.

Each maximum limiting wind-speed value determined is compared with the actual wind-speed values supplied by the wind speed sensors 2. If the existing wind speed value which is actually measured is 90% (first threshold) of the maximum limiting value determined by the microprocessor 4, the microprocessor 4 either causes a signal transmitter 14 to give the driver an acoustic warning signal or causes a signal transmitter 15 to give the driver an optical warning signal. At the same time, the time interval for the determination of the limiting value and for the comparison with the existing crosswind value actually measured is shortened in order to be able definitely to foresee a critical situation.

If the existing value of wind-speed approaches the maximum limiting value, and if the speed of the vehicle has not been reduced after the warning signal was given, then, after a predetermined period of time after the warning signal has been given, the microprocessor 4 provides information to the motor control electronics 11, which, via the output stage 12, so adjusts the throttle valve 13 that the speed of the vehicle is automatically reduced.

It is also possible that, after a second threshold of 98% of the maximum wind speed limiting value has been reached, the microprocessor 4 acts on the vehicle control. In addition to the action on the throttle valve, action on the brakes or the transmission is also conceivable.

Figure 2:
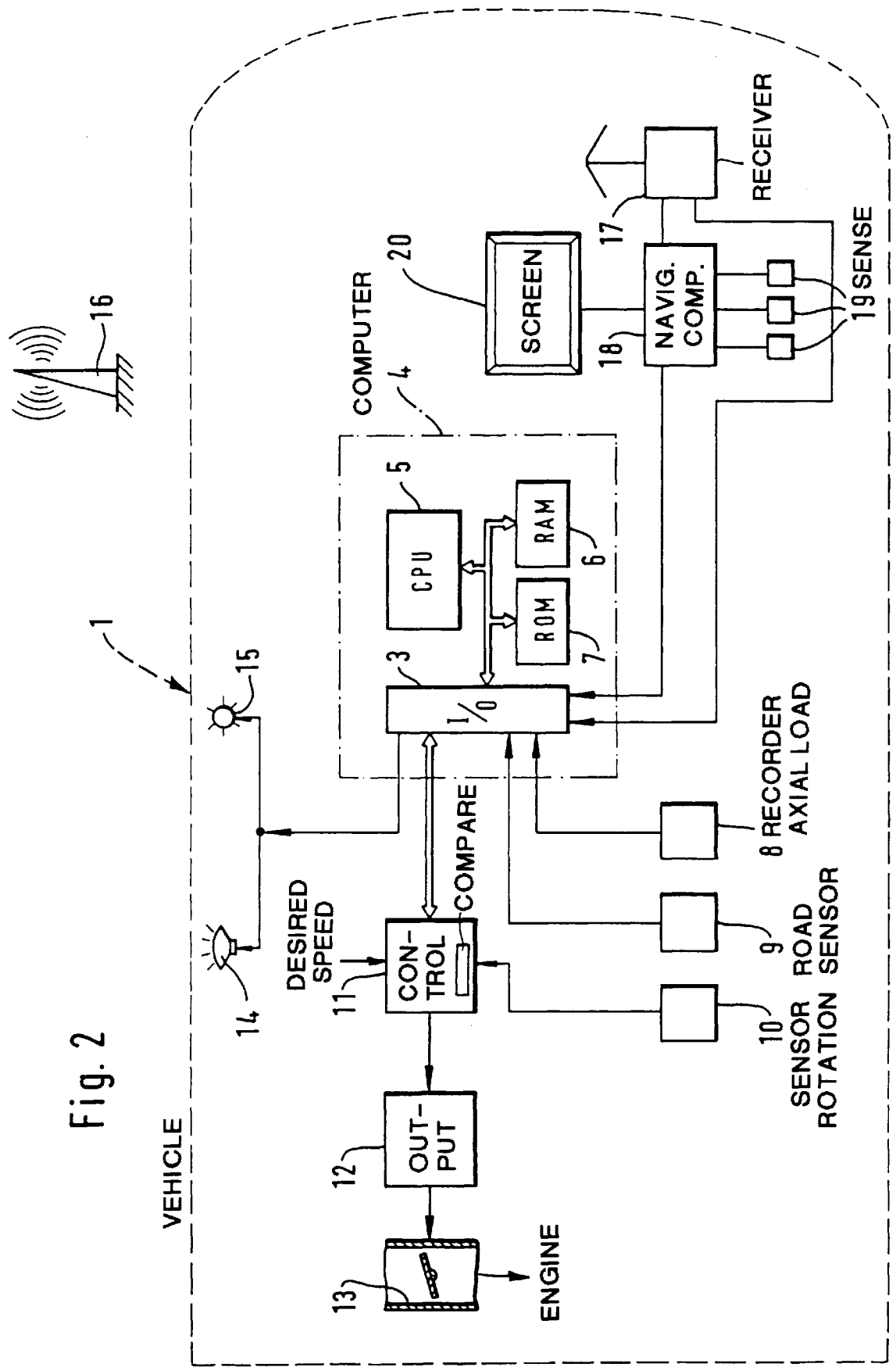
FIG. 2 is a similar diagram of a crosswind warning and/or control device with navigation computer in accordance with the invention.

In the embodiment of the crosswind warning device of the invention which is shown in FIG. 2, data concerning traffic, roads, and the actually prevailing wind speeds measured locally in these regions are transmitted by a mobile radio system 16 to a mobile radio receiver 17 arranged in the motor vehicle 1. The mobile radio receiver 17 conducts the information to a navigation computer 18 which, with the aid of sensors 19 arranged on the motor vehicle 1 determines at each moment the exact location of the vehicle 1. By the comparison of the existing location and the transmission of the routes with the actual local wind velocities, the maximum limiting value corresponding to the existing local wind speed is formed in the computer 4. Furthermore, an early warning to the driver with regard to a region of high wind speed into which he is entering is possible.

The navigation computer 18 furthermore is connected to a picture screen 20 which, for instance, shows a route and on which the wind speeds can be entered in the route.

In addition to the determination of the maximum permissible crosswind speed, this embodiment thus permits transmission in advance of information as to the wind over an existing traffic report system or digital radio.

What is claimed is:

1. A system suitable for triggering any one of a control process and a warning process in a motor vehicle with respect to crosswind, the system comprising:

crosswind means for determining the existing value of crosswind actually acting on the motor vehicle;

limit means for the determination and evaluation of a limiting value of wind speed, said limit means being carried by the vehicle for the determination of a limiting value of the crosswind speed, the limiting value being dependent on existing conditions of travel of the vehicle, said limit means including means for receiving data of the travel conditions, said travel conditions including conditions of road surface and equipment on board the vehicle;

comparison means, and a utilization device;

wherein values of windspeed detected by said crosswind means are compared via said comparison means with crosswind speed limiting values determined by said limit means, said utilization device being actuated as a function of a comparison outputted by said comparison means; and the system includes wireless communication means, and said crosswind means is disposed outside the motor vehicle, said communication means serving for transmitting the actual value of the crosswind speed corresponding to the location of the motor vehicle in wireless manner to said limit means.

2. A system according to claim 1, wherein the utilization device is in a driver information device.

3. A system according to claim 1, wherein the utilization device is a vehicle control device.

4. A system according to claim 1, wherein said limit means is operative to determine an existing limiting value of the crosswind speed at fixed time intervals during travel of the vehicle.

5. A system according to claim 2, wherein said driver information device comprises a signal transmitter for production of a warning signal which is an optical signal or an acoustic signal, said warning signal being produced as a present value of crosswind speed approaches an existing limiting speed value of the crosswind.

6. A system according to claim 1, further comprising sensors on the vehicle, wherein the limit means connect with the sensors, the sensors detecting any one of the speed of the vehicle or the condition of loading of the vehicle, or the condition of the road.

7. A system according to claim 1, further comprising a motor vehicle electronics, wherein the speed of travel of the motor vehicle is automatically controlled via said motor vehicle electronics operatively coupled to said limit means.

8. A system according to claim 1, wherein said limit means influences the steering of the vehicle.

9. A system according to claim 1, wherein the vehicle includes a brake system, and said limit means influences said brake system.

10. A system according to claim 1, wherein said crosswind means comprises a crosswind speed sensor disposed on the vehicle itself.

11. A system according to claim 1, wherein said limit means is a microprocessor.

12. A system according to claim 1, wherein said data receiving means comprises a sensor of a travel condition.

13. A system suitable for triggering a control process and a warning process in a motor vehicle with respect to crosswind, the system comprising:

crosswind means for determining the existing value of crosswind actually acting on the motor vehicle;

limit means for the determination and evaluation of a limiting value of wind speed, said limit means being carried by the vehicle for the determination of a limiting value of the crosswind speed, the limiting value being dependent on existing conditions of travel of the vehicle;

comparison means, and a utilization device;

wherein values of windspeed detected by said crosswind means are compared via said comparison means with crosswind speed limiting values determined by said limit means, said utilization device being actuated as a function of a comparison outputted by said comparison means;

said limit means influences the steering of the vehicle;

said crosswind means comprises a crosswind speed sensor disposed on the vehicle itself; and the system includes wireless communication means, and said crosswind means is disposed outside the motor vehicle, said communication means serving for transmitting the actual value of the crosswind speed corresponding to the location of the motor vehicle in wireless manner to said limit means.

14. A system according to claim 13, wherein said limit means receives the actual values of the crosswind speed via a mobile radio receiver of said communication means, and has a navigation computer which determines the location of the motor vehicle.

* * * * *